(12) United States Patent
Ong et al.

(10) Patent No.: US 9,269,394 B2
(45) Date of Patent: Feb. 23, 2016

(54) METHODS FOR READING DATA FROM A STORAGE MEDIUM USING A READER AND STORAGE DEVICES

(71) Applicant: MARVELL INTERNATIONAL LTD., Hamilton (BM)

(72) Inventors: Chun Lian Ong, Singapore (SG); Zhimin Yuan, Singapore (SG); Shiming Ang, Singapore (SG)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 13/946,621

(22) Filed: Jul. 19, 2013

(65) Prior Publication Data

US 2014/0022877 A1    Jan. 23, 2014

Related U.S. Application Data

(60) Provisional application No. 61/673,274, filed on Jul. 19, 2012.

(51) Int. Cl.
*G11B 20/24* (2006.01)
*G11B 20/10* (2006.01)
*G11B 20/12* (2006.01)

(52) U.S. Cl.
CPC .......... *G11B 20/24* (2013.01); *G11B 20/10046* (2013.01); *G11B 20/1217* (2013.01); *G11B 2220/2516* (2013.01)

(58) Field of Classification Search
CPC ........ G11B 3/02; G11B 3/06; G11B 3/08503; G11B 3/08512; G11B 3/08535; G11B 5/5526; G11B 5/553

USPC .................. 369/27.01, 28.01, 30.01, 30.04, 369/30.07–30.12, 30.18, 30.2, 30.24, 30.25, 369/30.3, 44.11, 44.32, 44.37, 44.41, 47.22, 369/47.27, 47.28, 47.31, 47.46, 369/47.47–47.55

See application file for complete search history.

(56) References Cited

U.S. PATENT DOCUMENTS

| | | | |
|---|---|---|---|
| 3,404,392 A | 10/1968 | Sordello | |
| 2004/0179386 A1 | 9/2004 | Jun | |
| 2005/0007690 A1* | 1/2005 | Wong et al. | 360/77.06 |
| 2005/0141123 A1 | 6/2005 | Roth | |
| 2005/0254407 A1* | 11/2005 | Hwang | G11B 7/24 369/275.1 |

(Continued)

FOREIGN PATENT DOCUMENTS

GB    2358505 A    7/2001

OTHER PUBLICATIONS

Written Opinion for Singapore Patent Application No. 2013055314 dated Sep. 26, 2014, pp. 1-11.

(Continued)

*Primary Examiner* — Dionne H Pendleton

(57) ABSTRACT

According to various embodiments, a method for reading data from a storage medium using a reader, wherein the reader includes at least one reader head, may be provided, wherein the storage medium includes a plurality of tracks. The method may include: reading a first signal with a reader head of the reader at a pre-determined position of the storage medium; reading a second signal with a reader head of the reader at the pre-determined position of the storage medium; and determining data stored at the pre-determined position of the storage medium based on the first signal and based on the second signal.

16 Claims, 10 Drawing Sheets

(56) References Cited

U.S. PATENT DOCUMENTS

| | | |
|---|---|---|
| 2007/0025004 A1 | 2/2007 | Stein et al. |
| 2008/0219109 A1* | 9/2008 | Maeda et al. ............... 369/44.14 |
| 2010/0195244 A1* | 8/2010 | Mochizuki et al. ........ 360/77.02 |
| 2011/0181978 A1* | 7/2011 | Rub ............................... 360/55 |
| 2012/0154947 A1* | 6/2012 | Cho et al. ........................ 360/53 |
| 2013/0083417 A1* | 4/2013 | Worrell et al. .................. 360/45 |

OTHER PUBLICATIONS

Search Report for Singapore Patent Application No. 2013055314 dated Sep. 26, 2014, pp. 1-6.

* cited by examiner

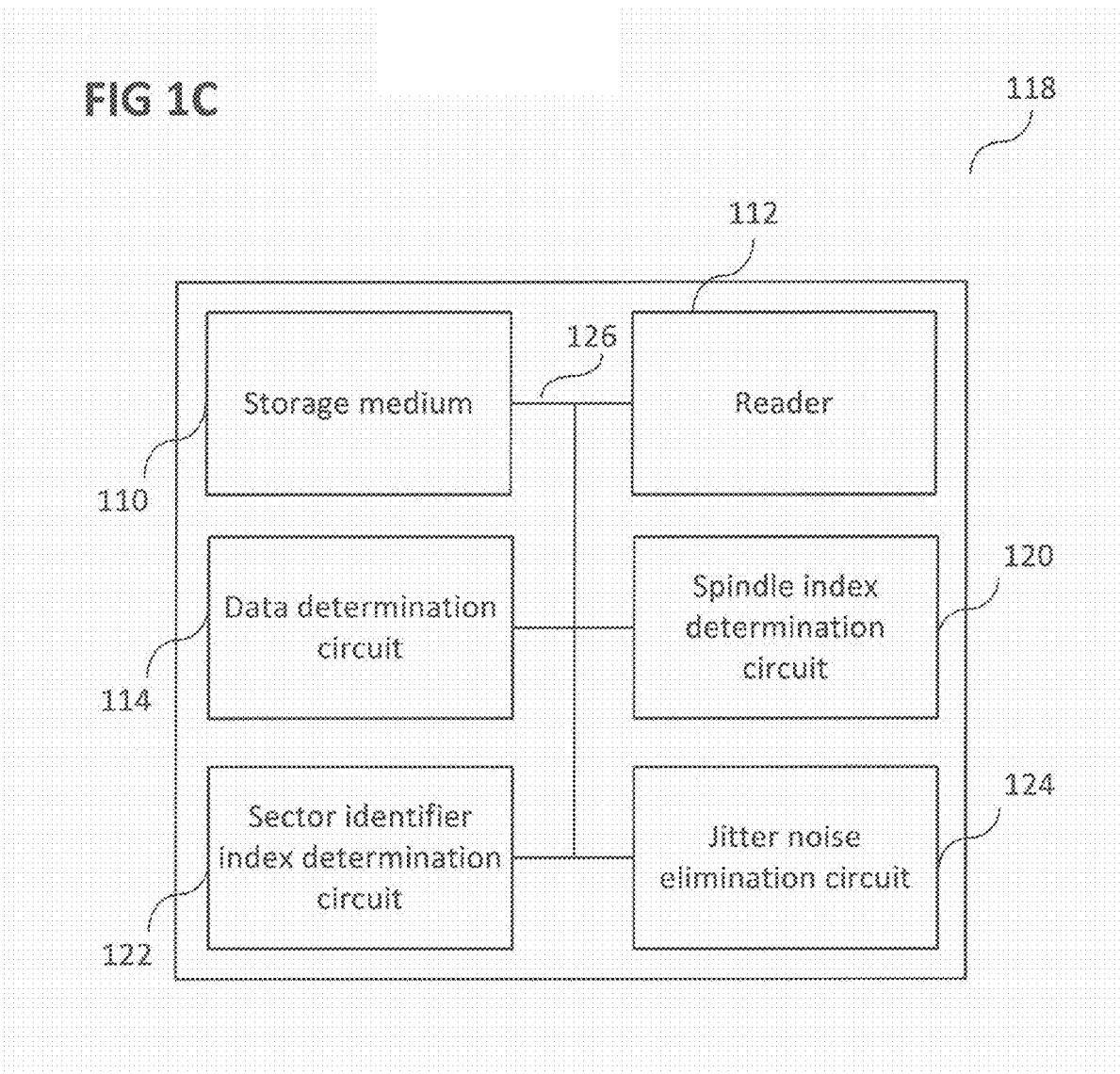

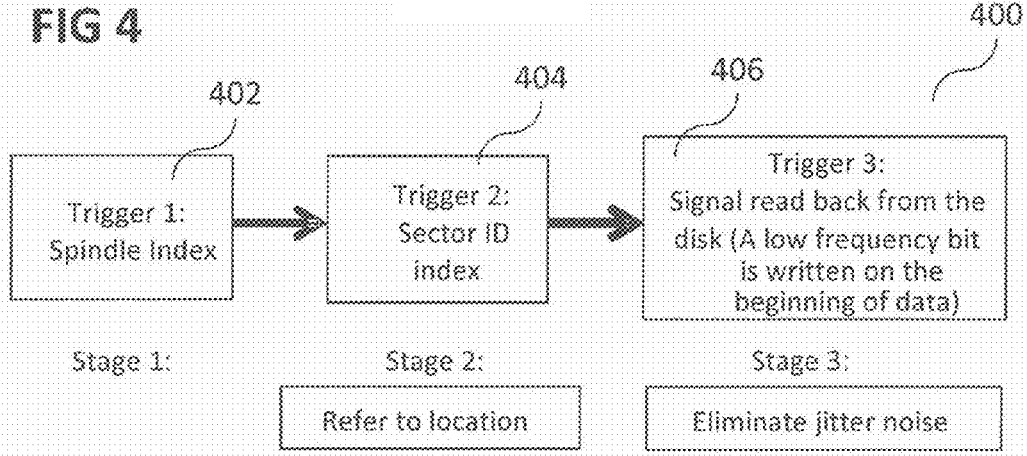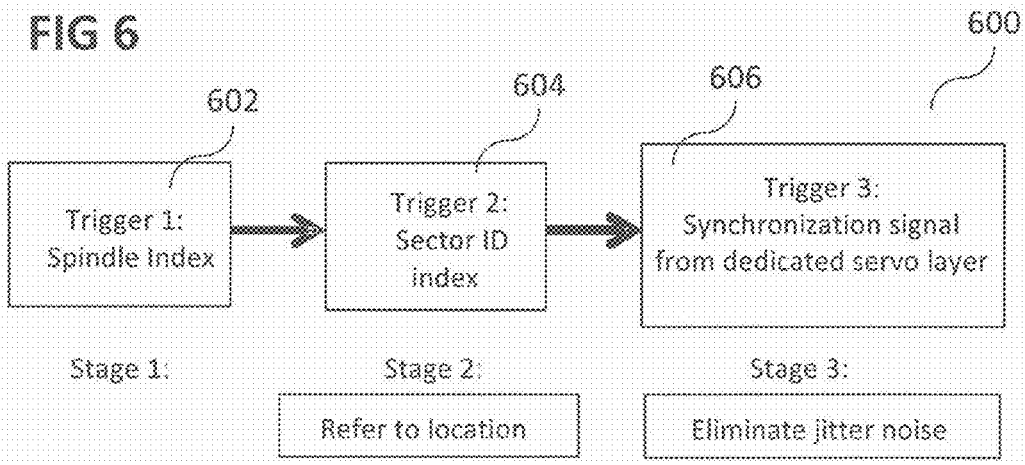

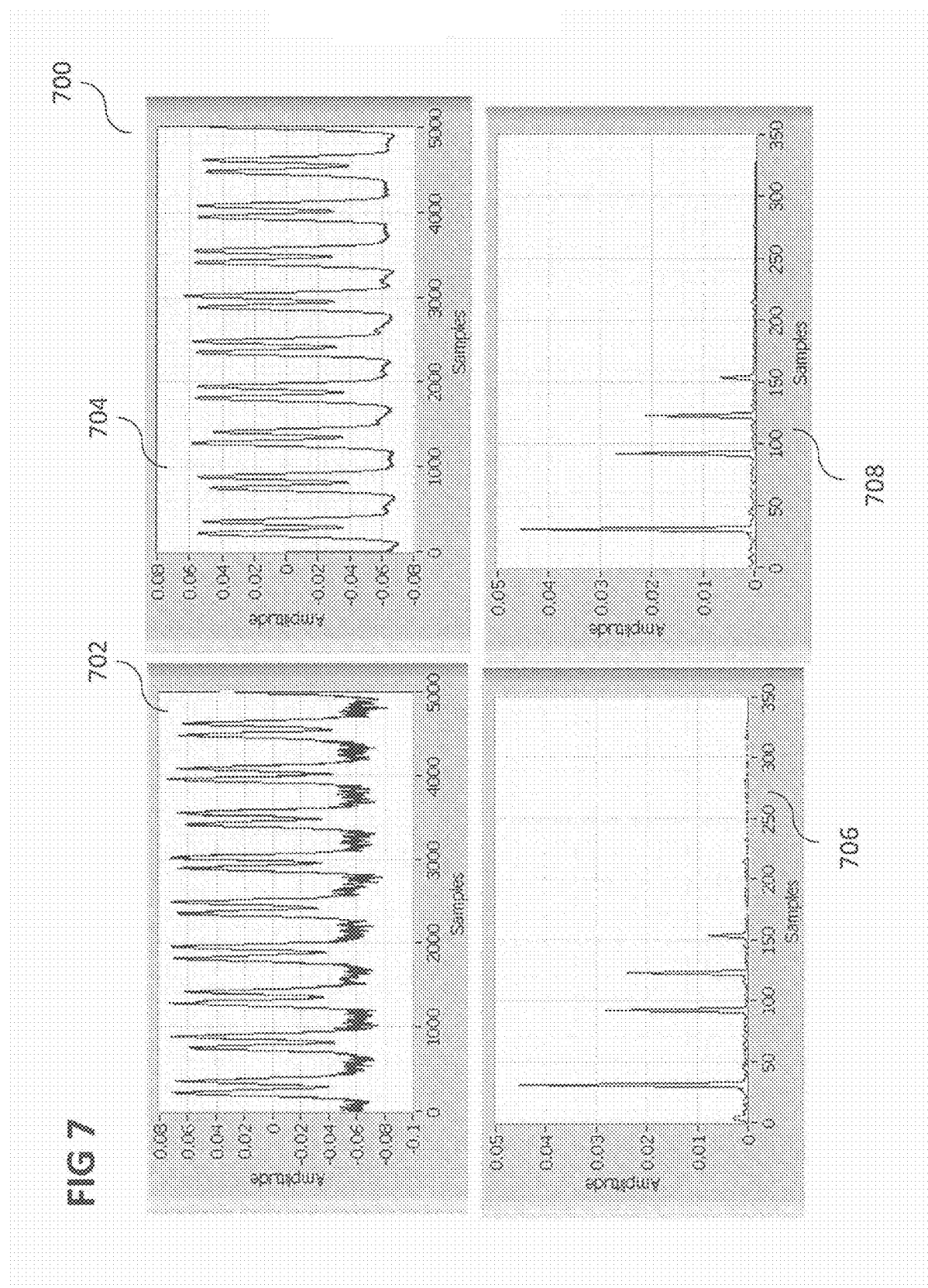

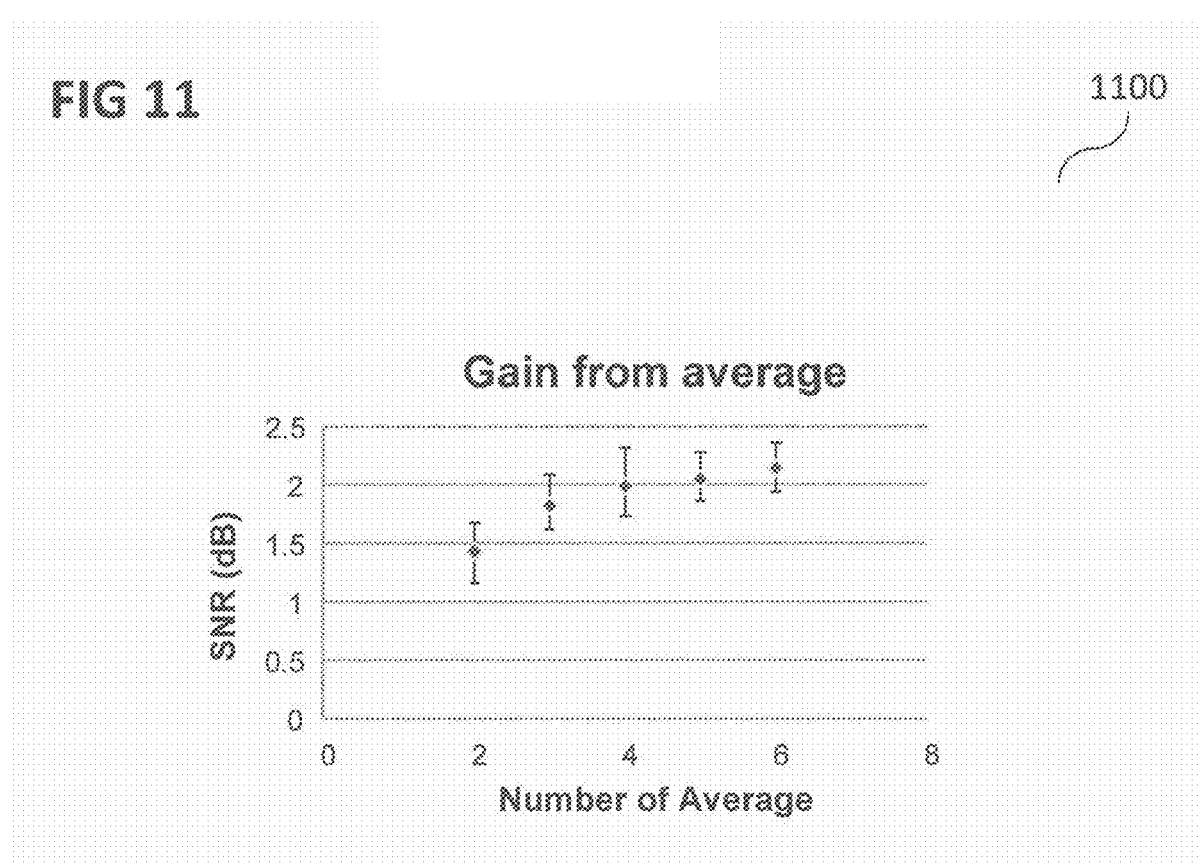

METHODS FOR READING DATA FROM A STORAGE MEDIUM USING A READER AND STORAGE DEVICES

CROSS-REFERENCE TO RELATED APPLICATION

The present application claims the benefit of the U.S. provisional patent application No. 61/673,274 filed on 19 Jul. 2012, the entire contents of which are incorporated herein by reference for all purposes.

TECHNICAL FIELD

Embodiments relate generally to methods for reading data from a storage medium using a reader and to storage devices.

BACKGROUND

The amount of data to be stored on data storage devices is increasing. Thus, it may be desired to provide reliable data storage devices with a high data storage capacity.

SUMMARY

According to various embodiments, a method for reading data from a storage medium using a reader may be provided, wherein the storage medium includes a plurality of tracks. The method may include: reading a first signal with a reader head of the reader at a pre-determined position of the storage medium; reading a second signal with a reader head of the reader at the pre-determined position of the storage medium; and determining data stored at the pre-determined position of the storage medium based on the first signal and based on the second signal.

According to various embodiments, a storage device may be provided. The storage device may include: a storage medium including a plurality of tracks; a reader configured to read a first signal with a reader head of the reader at a pre-determined position of the storage medium and configured to read a second signal with a reader head of the reader at the pre-determined position of the storage medium; and a data determination circuit configured to determine data stored at the pre-determined position of the storage medium based on the first signal and based on the second signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1C shows a storage device in accordance with an embodiment;

FIG. 4 shows a schematic diagram of multiple trigger stage for location reference and eliminating read jitter according to various embodiments, for example for a conventional medium with a single layer;

FIG. 6 shows a schematic diagram of multiple trigger stage for location reference and eliminating read jitter according to various embodiments, for example for a medium with a dedicated servo;

FIG. 7 shows an illustration of results of data before and after average according to various embodiments;

FIG. 11 shows a graph that shows SNR gain from multiple reading average according to various embodiments.

DESCRIPTION

Figure 1A:
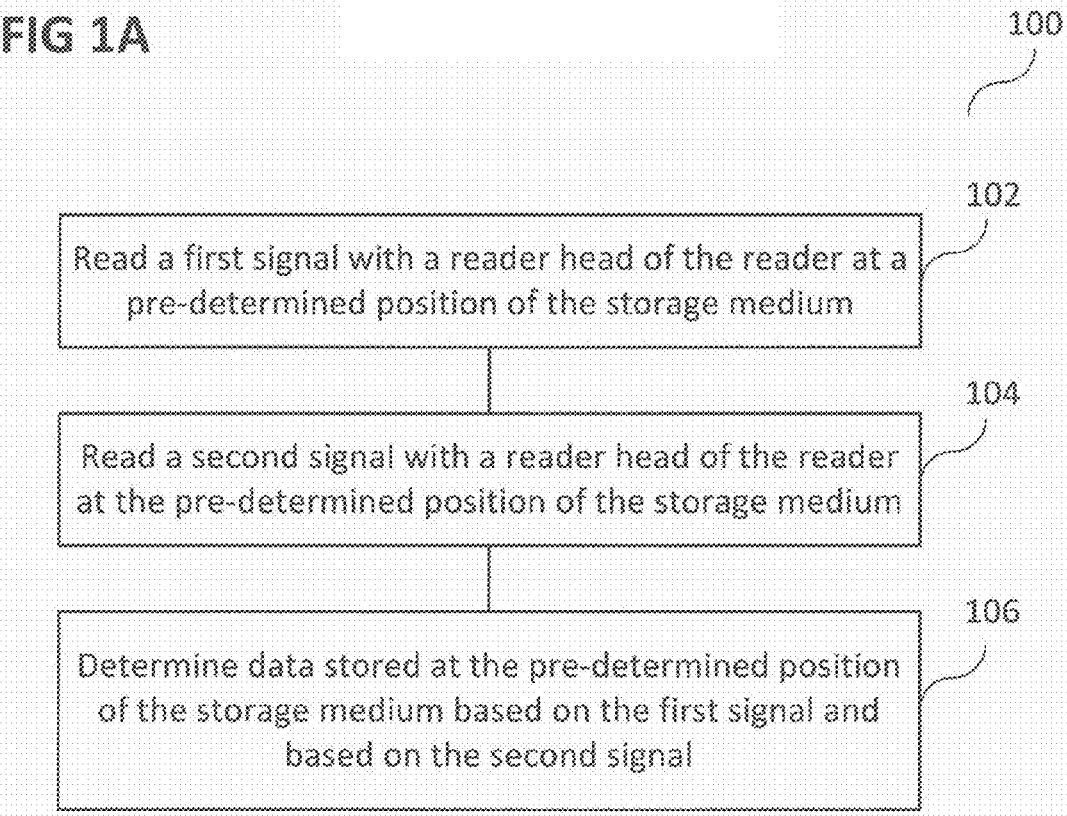
FIG. 1A shows a flow diagram illustrating a method for reading data from a storage medium using a reader in accordance with an embodiment.

Embodiments described below in context of the devices are analogously valid for the respective methods, and vice versa. Furthermore, it will be understood that the embodiments described below may be combined, for example, a part of one embodiment may be combined with a part of another embodiment.

In this context, the storage device as described in this description may include a memory which is for example used in the processing carried out in the storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The amount of data to be stored on data storage devices is increasing. Thus, it may be desired to provide reliable data storage devices with a high data storage capacity.

Reducing the bit aspect ratio (BAR) may be a way to further increase the areal density of HDD (hard disk drives) in the future. Shingled writing with a sharp field gradient may be a promising approach to further reduce the track pitch for higher KTPI (or kTPI, or kilo TPI, wherein TPI may stand for tracks per inch). The reader width may be a determination factor for achievable areal density. With noise limitation and also fabrication tolerance limit, the further reduction of the track width of a reader may be an issue with a big challenge, especially, reducing BAR towards 1.

A shingled magnetic recording (SMR) may include a plurality of shingled or overlapping tracks. For instance, a first track may be overlapped by a second track immediately adjacent (i.e. contiguous) to the first track and the second track may be overlapped by a third track immediately adjacent (i.e. contiguous) to the second track. Each track may have a track pitch (or track width; i.e. the non-overlapped portions of the width of a data track).

Shingled magnetic recording may reduce the bit aspect ratio and may require a narrow reader. It may become challenging for the reader to maintain the signals by large magnetoresistive (MR) ratio and not to increase the noise. But the reader scaling reduces the reader SNR. SNR may have a direct impact on the bit error rate which relates closely to the areal density.

According to various embodiments, a method to improve the SNR by multiple read averaging may be provided.

According to various embodiments, by writing a trigger signal at the beginning of the data track, read jitter may be removed, and as a result, multiple reading averaging may be enabled to reduce non-repeatable noise sources.

FIG. 1A shows a flow diagram 100 illustrating a method for reading data from a storage medium using a reader in accordance with an embodiment. The storage medium may include a plurality of tracks. The reader may include for example one reader head or a plurality of reader heads, for example multiple readers on a single slider. According to various embodiments, the tracks may be shingled tracks (in other words: the plurality of tracks may be overlapping; in other words: the plurality of tracks may be shingled tracks). According to various embodiments, the tracks may be non-shingled tracks. In 102, a first signal may be read with a reader head of the reader at a pre-determined position of the storage medium. In 104, a second signal may be read with a reader head of the reader (for example the same reader head used for reading the first signal, or another reader head of the reader) at the pre-determined position of the storage medium. In 106, data stored at the pre-determined position of the storage medium may be determined based on the first signal and based on the second signal. A reader with a plurality of reader heads may perform parallel plurality read. A reader with a single reader head may do sequential plurality read.

In other words: according to various embodiments, signals from an identical pre-determined position of the recording medium may be read repeatedly, and the data stored at the pre-determined position may be determined based on the repeatedly read signals.

According to various embodiments, the method may further include: reading a plurality of signals, wherein for each signal a reader head of the reader is at the pre-determined position of the storage medium; and determining the data stored at the pre-determined position of the storage medium based on the plurality of signals.

According to various embodiments, the method may further include determining the data stored at the pre-determined position of the storage medium based on averaging the first signal and the second signal.

According to various embodiments, the method may further include: reading a frequency burst signal with a reader head of the reader at a position of the storage medium including a frequency burst provided before a data track on the storage medium. According to various embodiments, the determining of the data stored at the pre-determined position of the storage medium may further be based on the frequency burst signal.

According to various embodiments, the method may further include: determining a trigger signal directly from a readback signal from the storage medium; and determining a mechanical jitter free signal based on the trigger signal. According to various embodiments, determining the data stored at the pre-determined position of the storage medium may further be based on the mechanical jitter free signal.

According to various embodiments, the storage medium may further include (or use) a dedicated servo layer.

According to various embodiments, the method may further include determining a spindle index; and determining the data stored at the pre-determined position of the storage medium further based on the determined spindle index.

According to various embodiments, the method may further include: determining a sector identifier index; and determining the data stored at the pre-determined position of the storage medium further based on the determined sector identifier index.

According to various embodiments, the method may further include: eliminating mechanical induced jitter noise; and determining the data stored at the pre-determined position of the storage medium based on the first signal and based on the second signal after the jitter noise has been eliminated e.g. based on the first signal and based on the second signal which have been read after the mechanical induced jitter noise has been eliminated.

According to various embodiments, eliminating the mechanical induced jitter noise may include or may be determining a low frequency bit on a beginning of a data track which includes the pre-determined. The signal can be the preamble of Servo Address Mark (SAM) or Auto Gain Control (AGC).

According to various embodiments, eliminating the mechanical induced jitter noise may include or may be determining a synchronization signal from a dedicated servo layer.

Figure 1B:
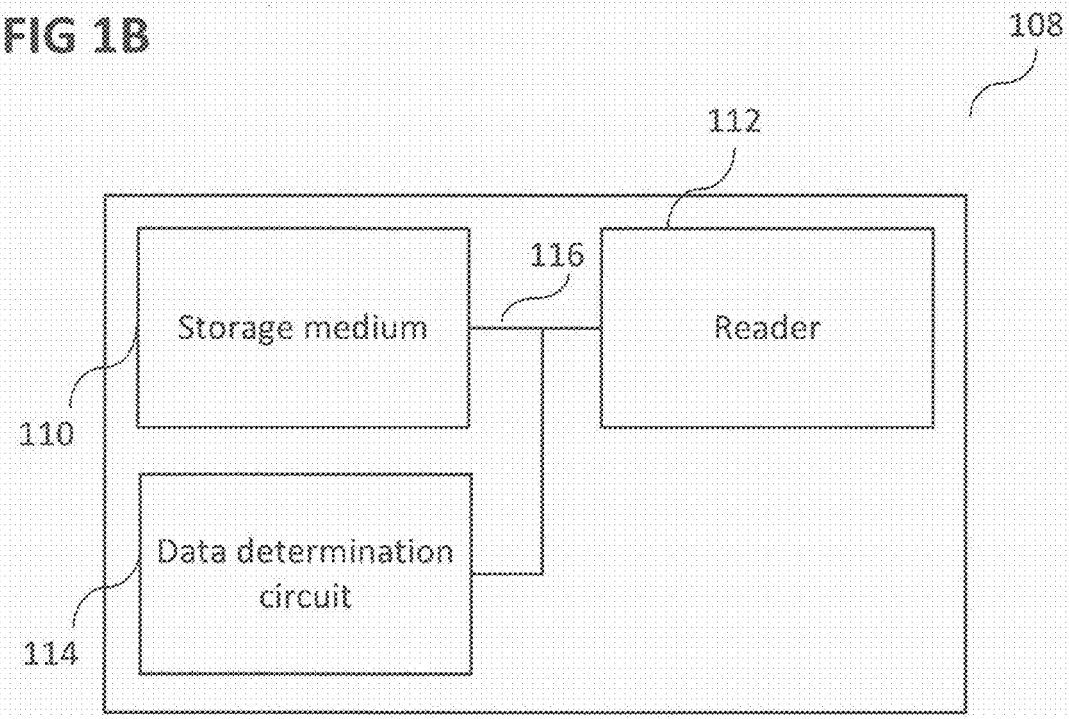
FIG. 1B shows a storage device in accordance with an embodiment.

FIG. 1B shows a storage device 108 (for example a hard disk drive) in accordance with an embodiment. The storage device 108 may include a storage medium 110. The storage medium 110 may include a plurality of tracks. According to various embodiments, the tracks may be shingled tracks (in other words: the plurality of tracks may be overlapping; in other words: the plurality of tracks may be shingled tracks). According to various embodiments, the tracks may be non-shingled tracks. The storage medium 110 may further include a reader 112 (which may include one or more reader heads) configured to read a first signal with a reader head of the reader 112 at a pre-determined position of the storage medium 110 and configured to read a second signal with a reader head of the reader 112 (for example the same reader head used for reading the first signal, or another reader head of the reader) at the pre-determined position of the storage medium 110. The storage medium 110 may further include a data determination circuit 114 configured to determine data stored at the pre-determined position of the storage medium based on the first signal and based on the second signal. The storage medium 110, the reader 112, and the data determination circuit 114 may be coupled with each other, like indicated by lines 116, for example electrically coupled, for example using a line or a cable, and/or mechanically coupled.

According to various embodiments, the reader 112 may further be configured to read a plurality of signals. For each signal, a reader head of the reader 112 may be at the pre-determined position of the storage medium 110. The data determination circuit 114 may further be configured to determine the data stored at the pre-determined position of the storage medium 110 based on the plurality of signals.

According to various embodiments, the data determination circuit 114 may further be configured to determine the data stored at the pre-determined position of the storage medium 110 based on averaging the first signal and the second signal.

According to various embodiments, the reader head 112 may further be configured to read a frequency burst signal with a reader head of the reader 112 at a position of the storage medium including a frequency burst provided before a data track on the storage medium 110. According to various embodiments, the data determination circuit 114 may further be configured to determine the data stored at the pre-determined position of the storage medium 110 further based on the frequency burst signal or a fixed known random pattern.

According to various embodiments, the data determination circuit 114 may further be configured to determine a trigger signal directly from a readback signal from the storage medium 110, further configured to determine a mechanical jitter free signal based on the trigger signal; and further configured to determine the data stored at the pre-determined position of the storage medium 110 further based on the mechanical jitter free signal.

According to various embodiments, the storage medium 110 may include a dedicated servo layer.

FIG. 1C shows a storage device 118 in accordance with an embodiment. The storage device 118 may, similar to the storage device 108 of FIG. 1B, include a storage medium 110. The storage device 118 may, similar to the storage device 108 of FIG. 1B, further include a reader 112. The storage device 118 may, similar to the storage device 108 of FIG. 1B, further include a data determination circuit 114. The storage device 118 may further include a spindle index determination circuit 120, like will be described in more detail below. The storage device 118 may further include a sector identifier index determination circuit 122, like will be described in more detail below. The storage device 118 may further include a jitter noise elimination circuit 124, like will be described in more detail below. The storage medium 110, the reader 112, the data determination circuit 114, the spindle index determination circuit 120, the sector identifier index determination circuit 122, and the jitter noise elimination circuit 124 may be coupled with each other, like indicated by lines 126, for example electrically coupled, for example using a line or a cable, and/or mechanically coupled.

According to various embodiments, the spindle index determination circuit 120 may be configured to determine a spindle index. According to various embodiments, the data determination circuit 114 may further be configured to determine the data stored at the pre-determined position of the storage medium 110 further based on the determined spindle index.

According to various embodiments, the sector identifier index determination circuit 122 may be configured to determine a sector identifier index. According to various embodiments, the data determination circuit 114 may further be configured to determine the data stored at the pre-determined position of the storage medium 110 further based on the determined sector identifier index.

According to various embodiments, the jitter noise elimination circuit 124 may be configured to eliminate jitter noise. According to various embodiments, the data determination circuit 114 may further be configured to determine the data stored at the pre-determined position of the storage medium 110 based on the first signal and based on the second signal after the jitter noise has been eliminated, e.g. based on the first signal and based on the second signal which have been read after the jitter noise has been eliminated.

According to various embodiments, the jitter noise elimination circuit 124 may be configured to eliminate the jitter noise using determining a low frequency bit on a beginning of a data track which includes the pre-determined position.

According to various embodiments, the mechanical induced jitter noise elimination circuit 124 may be configured to eliminate the mechanical induced jitter noise using determining a synchronization signal from a dedicated servo layer (e.g. of the storage medium).

Figure 2:
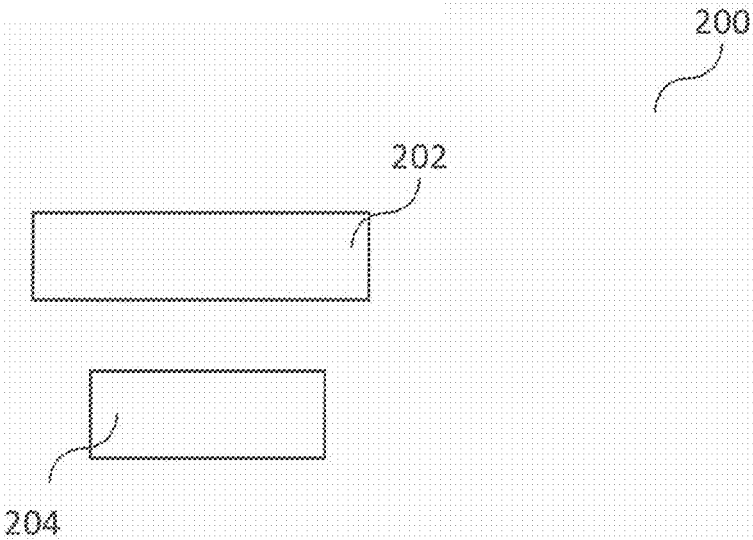
FIG. 2 shows a multi readers head on a same slider configuration in accordance with an embodiment.

FIG. 2 shows a multi readers head on a same slider configuration 200 in accordance with an embodiment. For example, a first reader head 202 and a second reader head 204 may be provided on a single reader (for example a first reader head 202 and a second reader head 204 may be provided on a single slider). It will be understood that the first reader head 202 and the second reader head 204 may be of the same size or of different size. It will be understood that although two reader heads in one reader are shown in FIG. 2, the number of reader heads in a reader may be any number, for example only one reader head in the reader or more than two reader heads in the reader.

According to various embodiments, an SNR (signal-to-noise ratio) may be improved by multiple read averaging.

According to various embodiments, a multiple stage of triggering may be applied. A special low frequency may be written at the location in front of a data track. This special low frequency data which is written simultaneously with the data signal may serve as trigger signal to remove the mechanical induced read jitter. After the pre-condition is achieved (for example mechanical induced read jitter is removed), multiple reading average may be conducted. Averaging may remove the non-repeatable noise and enhance the overall SNR. A 2 average (in other words: averaging of two readings) may improve the SNR by 1.5 dB.

In magnetic recording system, there may be three major noise sources: media (jitter) noise, head noise, and electronics noise. The media jitter noise may be repeatable, which is determined by the writing process. The head noise and the electronics noise may be non-repeatable, and may be reduced by averaging of multiple readings of the same data.

In other words: Source of noise in HDD system may include: media noise (for example transition noise or jitter noise); reader noise (which may currently be small; however, with the further scaling of reader dimensions, the SNR of reader may drop towards 20 dB or even below); and electronic noise (for example Johnson noise, or thermal noise, or Nyquist noise, or Johnson-Nyquist noise).

The non-repeatable noise may be reduced to improve the SNR. The jitter noise may be repeatable. But the reader and electronics noises may be non-repeatable and may be reduced by the multiple revolution averaging (in other words: averaging of readings of a same position on the disk at a plurality of revolutions of the disk).

SNR gain may then translate into AD (areal density) gain.

Figure 3:
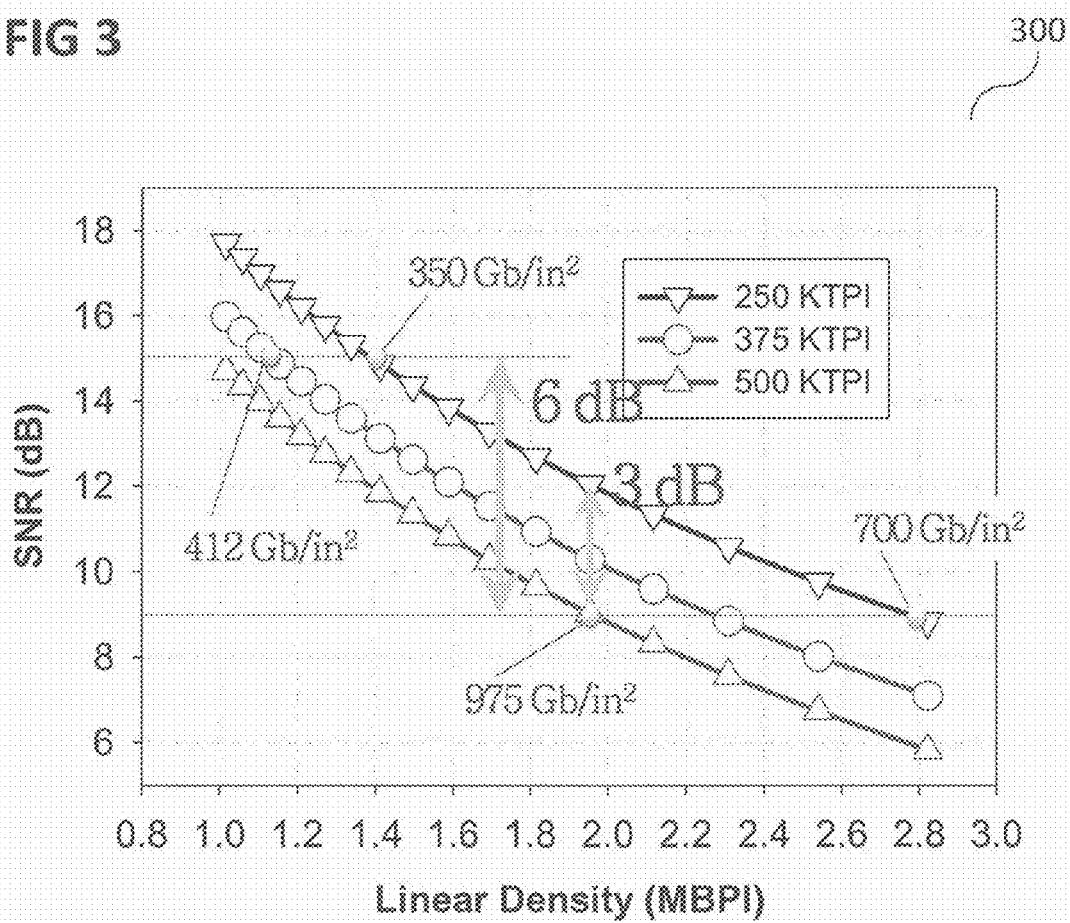
FIG. 3 shows a diagram illustrating a relationship between linear density and SNR for various densities.

FIG. 3 shows a diagram 300 illustrating a relationship between linear density and SNR for various densities. Diagram 300 illustrates that double linear density may require 6 dB SNR gain. Furthermore, double track density may need 3 dB SNR gain. To keep that BAR (bit aspect ratio) constant, double AD (areal density) may require (6+3)/2=4.5 dB SNR gain.

According to various embodiments, an average signal from multiple reads on the same track may be performed to reduce the non-repeatable noise. The improved SNR may yield areal density gain.

According to various embodiments, multiple stage triggers may be provided to remove mechanical induced read jitter to realize the accurate averaging. In other words: mechanical jitter issues may be eliminated by multiple stage triggering.

According to various embodiments, to realize the multiple reading average, a pre-condition of mechanical read jitter-free condition may be desired. This pre-condition may be achieved for example by multi-stage trigger configuration as shown in FIG. 4.

FIG. 4 shows a schematic diagram 400 of multiple trigger stage for location reference and eliminating mechanical induced read jitter according to various embodiments, for example for a conventional medium with a single layer. In a first stage 402, a spindle index may be considered (trigger 1). In a second stage 404, a sector ID (identifier index) may be considered, and this may refer to a location (on the disk) for address seeking purpose. In a third stage 406, a signal may be read back from the disk; for example a low frequency bit may be written on the beginning of the data. The third stage may be related to eliminating mechanical induced jitter noise. The first two triggers may be used to find the data location of intended data (eg. address seeking). This may also be referred to as location reference. The last trigger may be a signal directly obtained from a moving media from the reader. If it is phase locked to this signal, the read back signal may be mechanical jitter free. According to various embodiments, this mechanical jitter free signal may be produced for (and/or may be used for) multiple averaging.

Figure 5:
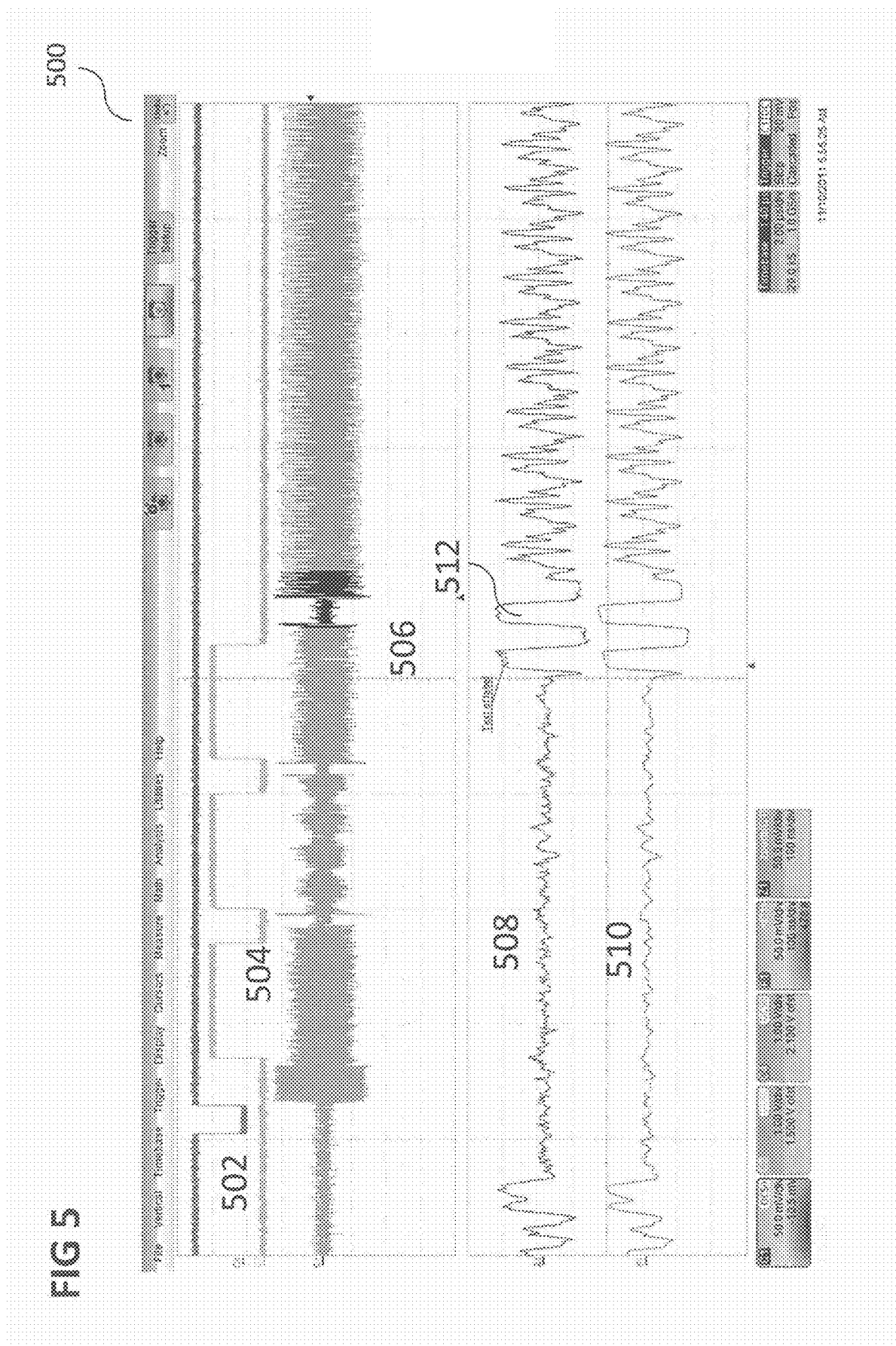
FIG. 5 shows a screen shot of a multi stage trigger signal according to various embodiments.

FIG. 5 shows a screen shot 500 of a multi stage trigger signal according to various embodiments. Stage 1 (502) may be a spindle index, stage 2 (504) may be a servo sector and stage 3 (506) may be the special written signal on the data track. Noise of averaged signal may be reduced. A raw data 508 and an averaged signal 510 are shown. In the left portion, a zoomed in portion is shown. Furthermore, a trigger pattern (for example a special written trigger pattern) 512 is shown.

As illustrated in FIG. 5, the spindle index signal (stage 1) 502 and servo sector index signal (stage 2) 504 may serve as trigger index to refer to location of interest. An additional low frequency pattern 512 may be written at the beginning of data and may serve as trigger signal for read jitter recovery. As this frequency pattern is from the disk with the data, it may remove mechanical induced read jitter effectively. FIG. 5 shows that the average signal is cleaner with less noise than the raw data signal.

It will be understood that FIGS. 4 and 5 is for illustration purpose to show one way of how to get the signal from moving disk by the reader according to various embodiments. The main idea may be to get the trigger signal out from the moving disk by the reader. This signal may provide a mechanical jitter free signal. The existing preamble of SAM or AGC may be used for this purpose. Furthermore, it will be understood that "trigger" means a method to phase lock the signal. Phase locked (or phase locking) may be understood as to align two (or more) signals at the same phase, or to synchronize two (or more) signals. There may be various ways of phase locking to the signal. For example, here a simple amplitude threshold is shown. The method may be used to phase lock the signal. According to various embodiments, a commonly known correlation method may be used for phase locking the signal.

FIG. 6 shows a schematic diagram 600 of multiple trigger stage for location reference and eliminating read jitter according to various embodiments, for example for a medium with a dedicated servo, for example a dedicated servo layer. In a first stage 602, a spindle index may be considered (trigger 1), similar to first stage 402 of FIG. 4. In a second stage 604, a sector ID (identifier index) may be considered, and this may refer to a location (on the disk), similar to second stage 404 of FIG. 4. In a third stage 606, a synchronization signal from a dedicated servo layer may be used. The third stage may be related to eliminating jitter noise. FIG. 7 shows an illustration 700 of results of data before and after average according to various embodiments. A plot 702 shows data before average, and plot 704 shows the data after average. Likewise, plot 706 shows a FFT (fast Fourier transform) of the data before average, and plot 708 shows a FFT of the data after average.

Figure 8:
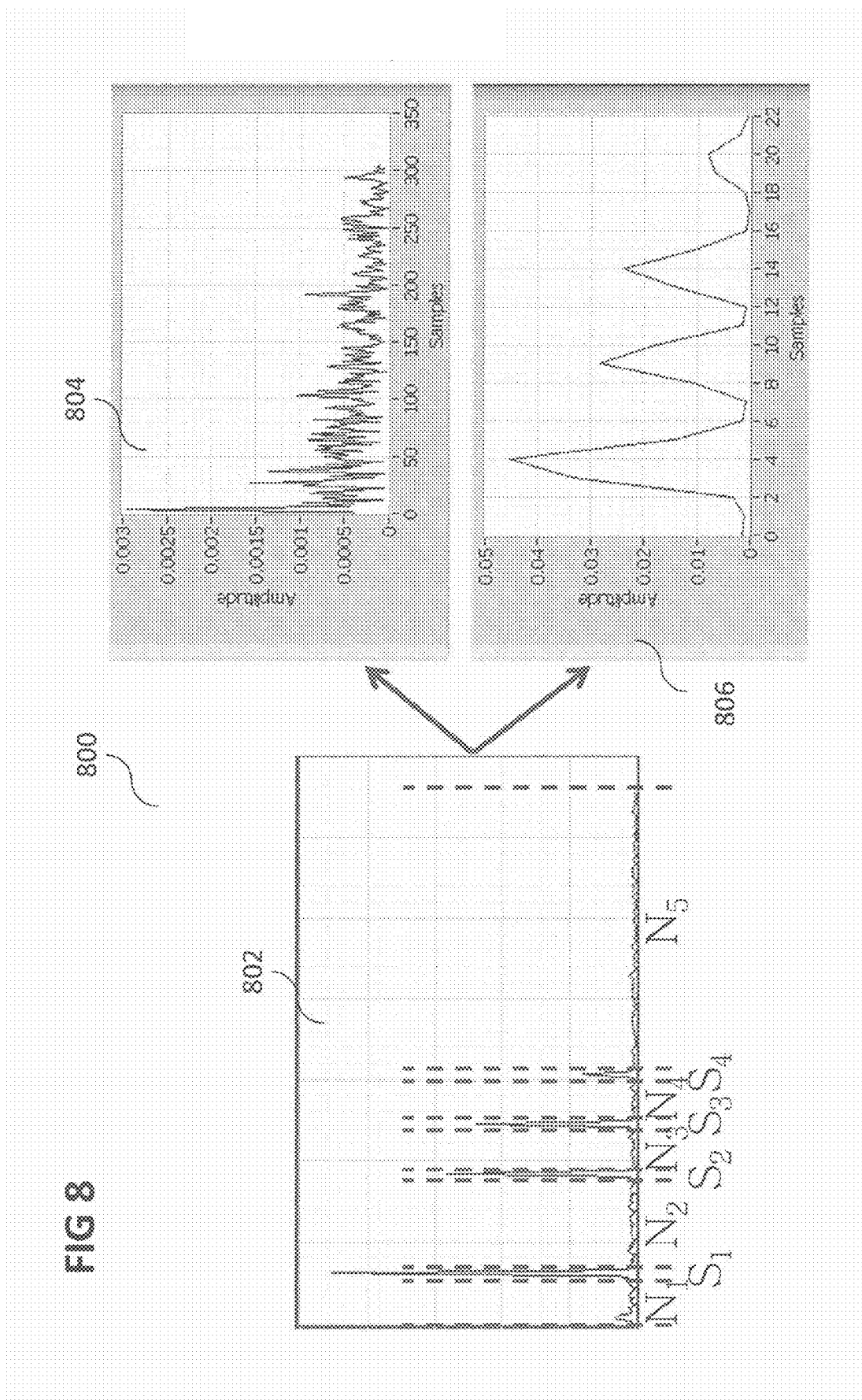
FIG. 8 shows an illustration of an SNR (signal-to-noise ratio) calculation according to various embodiments.

FIG. 8 shows an illustration 800 of the SNR calculation according to various embodiments. In 802, various noise components $N_i$ (with i an integer number; for example $N_1$, $N_2$, $N_3$, $N_4$ and $N_5$), and various data components (or signal components) $S_i$ (for example $S_1$, $S_2$, $S_3$, and $S_4$) are shown. Plot 804 shows noise data $N_1$ to $N_5$, while plot 806 shows signal components $S_1$ to $S_4$.

In order to quantify the SNR in dB, the following equation may be applied $$SNR = 20 \log_{10}\left(\frac{\sqrt{\sum S_i^2}}{\sqrt{\sum N_i^2}}\right)$$

In the following, the SNR with respect to the number of average (in other words: the number of measurements used for averaging) will be described.

Figure 9A:
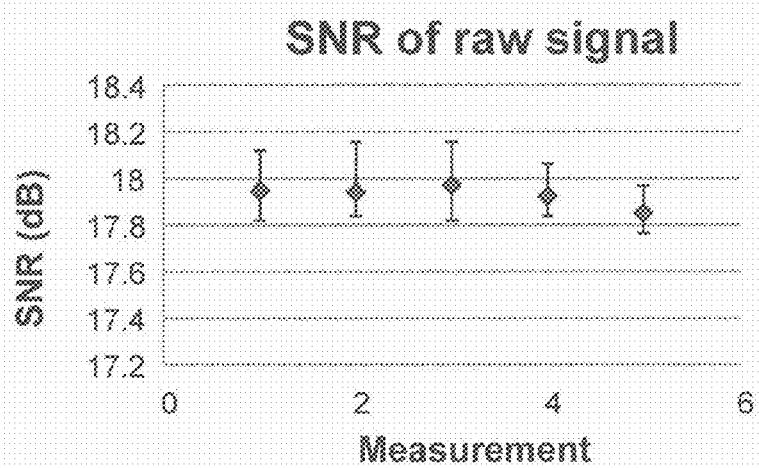
FIG. 9A shows a graph to show an SNR of raw data.

FIG. 9A shows a graph 900 to show the SNR of raw data. The size (or the number of samples) is 10 samples which are used per measurement. FIG. 9A shows that the SNR value of a single read data is about 18 dB for 5 measurements. Each measurement is repeated 10 times.

Figure 9B:
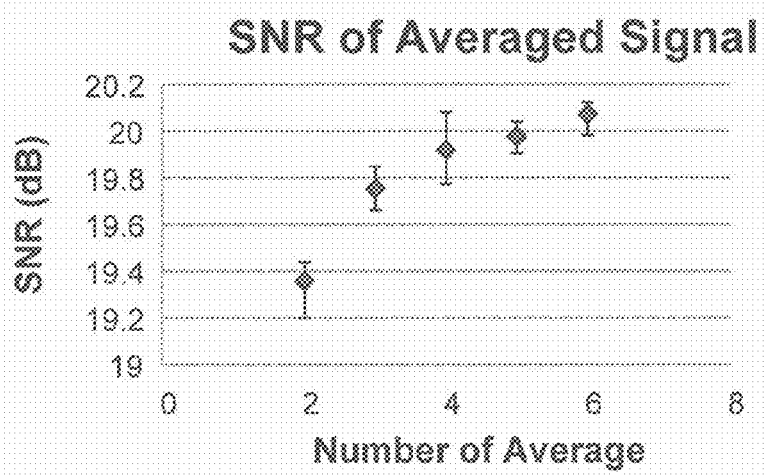
FIG. 9B shows a graph to indicate an SNR of averaged signal according to various embodiments.

FIG. 9B shows a graph 902 to indicate SNR of averaged signal according to various embodiments. The results of SNR for 2 time average to 6 time average are shown in the FIG. 9B. The SNR may increase as much as 1.5 dB for only 2 time average.

Figure 10A:
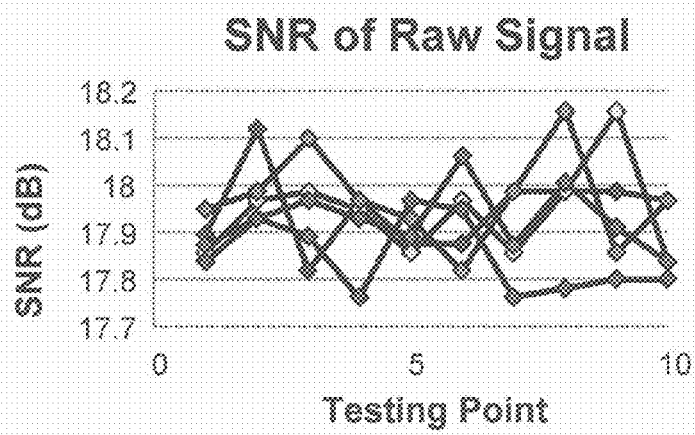
FIG. 10A shows a graph illustrating an SNR for a raw signal for a plurality of testing points.

FIG. 10A shows a graph 1000 illustrating an SNR for a raw signal (in other words: a single read signal; in other words: a signal not obtained using averaging) for a plurality of testing points.

Figure 10B:
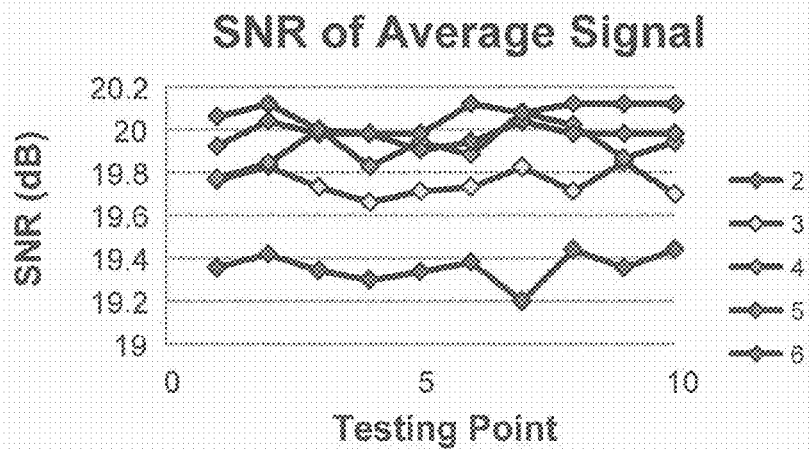
FIG. 10B shows a graph illustrating an SNR for an averaged signal for the plurality of testing points according to various embodiments.

FIG. 10B shows a graph 1002 illustrating an SNR for an averaged signal for the plurality of testing points according to various embodiments.

FIG. 11 shows a graph 1100 that shows SNR gain from multiple reading average according to various embodiments. The details of SNR improvement with respect to the number of average (in other words: the number of readings used for averaging) is shown in FIG. 11.

It will be understood that even though the SNR may be increased with the number of averaging, the data transfer rate may be reduced. However, in a hybrid hard disk drive (HDD), the time of data processing may be tolerable for a longer time. It may be feasible to apply the multiple reading for SNR improvement to increase areal density.

As described above, in magnetic recording system, there may be three major noise sources: media noise, head noise, and electronics noise. The media jitter noise may be repeatable, which may be determined by the writing process. The head and electronics noise may be non-repeatable, which may be reduced by averaging of multiple readings of the same data.

The shingled magnetic recording may reduce the bit aspect ratio and may require a narrow reader. It may become challenging for the reader to maintain the signals by large MR ratio and not to increase the noise. But the reader scaling may reduce the reader SNR. According to various embodiments, devices and methods may be provided to increase the SNR.

For example in a hybrid hard disk drive (HDD) with the shingled writing scheme, the time of data processing may be tolerable for a longer time. It may be feasible to apply the multiple reading for SNR improvement.

According to various embodiments, a special low frequency data bit may be written at the beginning of data track enable to eliminate read jitter enable multiple read averaging.

According to various embodiments, multiple read averaging may improve the SNR of HDD to improve Areal Density.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for reading data from a storage medium using a reader, wherein the reader comprises at least one reader head, the method comprising:
    reading a first signal with a reader head of the reader at a pre-determined position of the storage medium, wherein the storage medium comprises a plurality of tracks written using shingled magnetic recording;
    reading a second signal with a reader head of the reader at the pre-determined position of the storage medium;
    determining a trigger signal directly from a readback signal from the storage medium, wherein the trigger signal is a pre-written low-frequency signal at a beginning of a data track, which includes the pre-determined position; and
    determining a mechanical jitter free signal based on the trigger signal; and
    determining data stored at the pre-determined position of the storage medium based on (i) an average of the first signal and the second signal, (ii) and the mechanical jitter free signal.

2. The method of claim 1, further comprising:
    reading a plurality of signals, wherein for each signal a reader head of the reader is at the pre-determined position of the storage medium; and
    determining the data stored at the pre-determined position of the storage medium based on the plurality of signals.

3. The method of claim 1, wherein the storage medium comprises a dedicated servo layer.

4. The method of claim 1, further comprising:
    determining a spindle index; and
    determining the data stored at the pre-determined position of the storage medium further based on the determined spindle index.

5. The method of claim 1, further comprising:
    determining a sector identifier index; and
    determining the data stored at the pre-determined position of the storage medium further based on the determined sector identifier index.

6. The method of claim 1, further comprising:
    eliminating mechanical induced jitter noise; and
    determining the data stored at the pre-determined position of the storage medium based on the first signal and based on the second signal after the jitter noise has been eliminated.

7. The method of claim 6, wherein eliminating the jitter noise comprises determining a low frequency bit on a beginning of a data track which includes the pre-determined position.

8. The method of claim 6, wherein eliminating the mechanical induced jitter noise comprises determining a synchronization signal from a dedicated servo layer.

9. A storage device comprising:
    a storage medium comprising a plurality of tracks written using shingled magnetic recording;
    a reader comprising at least one reader head, the reader configured to read a first signal with a reader head of the reader at a pre-determined position of the storage medium and configured to read a second signal with a reader head of the reader at the pre-determined position of the storage medium; and
    a data determination circuit configured to:
    determine a trigger signal directly from a readback signal from the storage medium, wherein the trigger signal is a pre-written low-frequency signal at a beginning of a data track, which includes the pre-determined position;
    determine the mechanical jitter free signal based on the trigger signal; and
    determine data stored at the pre-determined position of the storage medium based on (i) an average of the first signal and the second signal and further based on (ii) the mechanical jitter free signal.

10. The storage device of claim 9, wherein:
    the reader is further configured to read a plurality of signals, wherein for each signal a reader head of the reader is at the pre-determined position of the storage medium; and
    the data determination circuit is further configured to determine the data stored at the pre-determined position of the storage medium based on the plurality of signals.

11. The storage device of claim 9, wherein the storage medium comprises a dedicated servo layer.

12. The storage device of claim 9, further comprising:
    a spindle index determination circuit configured to determine a spindle index; and
    wherein the data determination circuit is further configured to determine the data stored at the pre-determined position of the storage medium further based on the determined spindle index.

13. The storage device of claim 9, further comprising:
    a sector identifier index determination circuit configured to determine a sector identifier index;
    wherein the data determination circuit is further configured to determine the data stored at the pre-determined position of the storage medium further based on the determined sector identifier index.

14. The storage device of claim 9, further comprising:
    a jitter noise elimination circuit configured to eliminate mechanical induced jitter noise;
    wherein the data determination circuit is further configured to determine the data stored at the pre-determined position of the storage medium based on the first signal and based on the second signal after the jitter noise has been eliminated.

15. The storage device of claim 14, wherein the jitter noise elimination circuit is configured to eliminate the mechanical induced jitter noise using determining a low frequency bit on a beginning of a data track which includes the pre-determined position.

16. The storage device of claim 14, wherein the jitter noise elimination circuit is configured to eliminate the mechanical induced jitter noise using determining a synchronization signal from a dedicated servo layer.

* * * * *